United States Patent [19] [11] 4,312,671
Williame [45] Jan. 26, 1982

[54] PROCESS FOR THE PREPARATION OF A CONGLOMERATE SAND ANF PRODUCT

[75] Inventor: Paul H. R. Williame, Asnieres, France

[73] Assignee: Produits Ballu-Schuiling S.A., Clichy, France

[21] Appl. No.: 145,321

[22] Filed: Apr. 29, 1980

[30] Foreign Application Priority Data

May 7, 1979 [FR] France .................................. 79 11449

[51] Int. Cl.$^3$ .............................................. B28B 7/34
[52] U.S. Cl. .................................. 106/38.2; 501/110; 501/132; 501/133
[58] Field of Search ..................... 106/38.22, 38.2, 58; 260/DIG. 40, 39 SB; 164/43

[56] References Cited

U.S. PATENT DOCUMENTS

| | | | |
|---|---|---|---|
| 3,806,491 | 4/1974 | Gardikes et al. | 260/DIG. 40 |
| 3,954,695 | 5/1976 | Clecand | 260/DIG. 40 |
| 4,111,253 | 9/1978 | Epstein et al. | 260/DIG. 40 |
| 4,175,067 | 11/1979 | Kottke et al. | 260/39 SB |
| 4,206,262 | 6/1980 | Craig | 164/43 |

*Primary Examiner*—Lorenzo B. Hayes
*Attorney, Agent, or Firm*—Pearne, Gordon, Sessions, McCoy & Granger

[57] ABSTRACT

Process for the preparation of a foundry sand and the foundry sand composition which consists in mixing magnesium silicate and an arylsulphonic acid in aqueous medium as the binder.

11 Claims, No Drawings

PROCESS FOR THE PREPARATION OF A CONGLOMERATE SAND ANF PRODUCT

The present invention relates to conglomerate sands used particularly as foundry or moulding sands and to processes for the preparation thereof.

In an article entitled "Kallhärdande organiska bindemedel för olivinsand" (cold-setting organic binding agents for olivine sand) published in October 1973 in Svenska Gjuteriföreningen there is described a foundry sand containing, besides the basic olivine and furanic resin, a small proportion below 1% of an alcoholic solution of paratoluenesulphonic acid. Olivine has a basic character. To ensure that reaction with the acid does not take place, it is therefore recommended, on the one hand, to add a small quantity of acid just sufficient to catalyse the resin and, on the other hand, to work in an anhydrous alcoholic medium preventing any salification reaction, in order to preserve the acidity of the catalyst for polymerisation of the furanic resin.

The invention takes the opposite course to these measures. It advocates the salification reaction due to the addition of a significant quantity of acid in aqueous medium.

It has, in fact, been shown unexpectedly that this reaction, which it has hitherto been desired to avoid because it is prejudicial to the polymerisation of the furanic resin, makes it possible, on the contrary, to dispense with resin and to obtain nevertheless a self-hardening foundry sand having remarkable properties. It hardens rapidly in the cold. Its refractoriness is good. The cast metal in contact with the sand does not show any defects. There forms at the interface of the sand and of the metal a deposit of bright carbon facilitating removal from the mould due to the decomposition of an organic molecule. The sand is suitable for the casting of reducing metals, for example magnesium, since it has reducing characteristics owing to the sulphur products originating from the decomposition of a sulphonate.

The subject of the invention is therefore a process for the preparation of a conglomerate sand which consists in mixing a sand, containing at least 5% by weight of a magnesium silicate reactive with an acid, and an arylsulphonic acid, characterised in that it consists in effecting the mixing in aqueous medium in the presence of at least 25% by weight of arylsulphonic acid in relation to the weight of the magnesium silicate.

The acid generally represents at least 50% of the weight of the magnesium silicate, whilst water represents at least 25% of the weight of the arylsulphonic acid, preferably from 40 to 100% of said weight. It is simplest to use an aqueous solution of arylsulphonic acid.

The sand usually contains 10 to 20% by weight of magnesium silicate. The sand can be a siliceous sand, an olivine sand, a chromite sand or others. The starting sand generally has a grain size below 5 mm, preferably below about 1 mm.

There may be used as magnesium silicate capable of reacting with an acid sepiolite (3 $SiO_2$, 2 $MgO$, 1 $H_2O$), meerschaum ($Si_3O_{10}H_4Mg_2$), serpentine (2 $SiO_2$, 3 $MgO$, 1 $H_2O$) and, in general, all the silicates of the olivine group. Olivine is a silicate of magnesium and iron whose typical weight analysis is:
  $MgO$: 48 to 50%
  $SiO_2$: 41 to 43%
  $Fe_2O_3$: 6.5 to 8% the balance making up to 100% being composed of $Cr_2O_3$, $NiO$, $MnO$, $CaO$ and $Al_2O_3$.

The reaction is effected all the better if the magnesium silicate is used in the form of a finely divided powder. Excellent results are obtained if the grain size of the starting magnesium silicate is less than 0.15 mm, preferably less than 0.1 mm.

Of the suitable arylsulphonic acids there may be mentioned particularly those of formula:

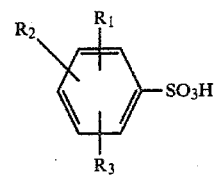

in which $R_1$, $R_2$ and $R_3$ are, independently of one another, hydrogen, hydroxy or straight or branched lower alkyl ($C_1$ to $C_6$, preferably $C_1$ to $C_4$). The most common of these acids are in descending order of preference benzenesulphonic acid, xylenesulphonic acids, phenolsulphonic acids, cumenesulphonic acids, particularly the para isomers. It is also possible to employ aralkylsulphonic acids whose alkyl portion has up to 6 carbon atoms, preferably less than 4 carbon atoms, for example benzylsulphonic acid.

It is economically advantageous to add to the arylsulphonic acid a strong acid, for example sulphuric acid, at less than 40%, preferably less than 15% by weight.

In the following Examples which illustrate the invention the parts and percentages are expressed by weight, unless expressly stated otherwise.

EXAMPLE 1

100 parts of olivine meal (passing through a screen having a mesh aperture of 0.074 mm) are mixed with 50 parts of paratoluenesulphonic acid at 65% and with 100 parts of water. The mixture is left overnight. It is filtered and washed. The last precipitate is extracted on a Soxhlet with water to recover the soluble salts. The soluble magnesium formed is estimated in the form of ammonium and magnesium phosphate and pyrophosphate after calcination. 33.79 grammes of magnesium salt of paratoluenesulphonic acid are obtained in comparison with a theoretical value of 34.5 grammes.

Salification of the acid by the olivine has therefore taken place.

EXAMPLES 2 to 4

20 parts of olivine meal (grain size below 0.074 mm) and 80 parts of siliceous sand are mixed respectively with 8, 10 and 12 parts of paratoluenesulphonic acid in aqueous solution at 65%.

The setting times and the temperature rises are noted.

A bending bar of the type GF (georg Fisher) is made and the bending strengths are determined 48 hours after the setting. The results are given in table I.

Comparative Example 1

Example 2 is repeated, but without adding water and replacing the aqueous acid solution by an anhydrous methanolic solution of paratoluenesulphonic acid at 70%. Salification practically does not occur.

Nor does a benzene solution of paratoluenesulphonic acid lead to significant salification.

Comparative Examples 2 to 6

Example 2 is repeated, but replacing the paratoluenesulphonic acid with respectively formic acid, acetic acid, dichloroacetic acid, glyoxylic acid and dodecylbenzenesulphonic acid. The same setting is observed only with the above-described sulphonic acids.

EXAMPLES 5 to 7

As in Example 2, 90 parts of siliceous sand, 10 parts of olivine and respectively 5, 6 and 7 parts of paratoluenesulphonic acid at 65% are mixed. The results obtained are shown in table I.

EXAMPLE 8

Example 5 is repeated, but with a benzenesulphonic acid solution at 70% by weight. The results obtained are given in table I.

EXAMPLE 9

90 parts of siliceous sand, 10 parts of olivine and 5 parts of a mixture of acid in aqueous solution at 65% containing 93% of paratoluenesulphonic acid and 7% of sulphuric acid are mixed. The results obtained are shown in table I.

TABLE 1

| Examples | Setting time in minutes | From initial temperature to final temperature in °C. | Bending strength in kg/cm³ |
| --- | --- | --- | --- |
| 2 | 15 | from 16 to 30 | 9 |
| 3 | 20 | from 16 to 39 | 15 |
| 4 | 25 | from 18 to 32 | 19 |
| 5 | 25 | from 16 to 24 | 4.5 |
| 6 | 30 | from 16 to 25 | 10 |
| 7 | 30 | from 16 to 28 | 14.5 |
| 8 | 40 | from 16 to 22 | 6.5 |
| 9 | 15 | from 16 to 26 | 7 |

A comparison of Example 7 and Example 9 shows the interest of a small addition of sulphuric acid.

The bars from each Example are placed in an oven. They do not crack. A sample from each Example is placed in a crucible and heated to 1200° C. in a muffle furnace. A deposit of bright carbon is obtained on the lid of the crucible.

EXAMPLE 10

80 parts by weight of olivine sand with a fineness of 40/80 AFS are mixed with 20 parts of olivine meal, 10 parts of commercial paratoluenesulphonic acid at 65% are added thereto in the cold and mixing is effected again for 30 seconds.

This mixture is introduced into a mould and compacted with a tamper. The temperature of the system rises quickly from 20° to 35° C. After 3 minutes of contact the product shows a rigidity sufficient for it to be removed from the mould without deformation. It contains magnesium paratoluenesulphonate.

After hardening, it is noted that the pH value of the system (dissolving a sample in water) is close to neutral, that is the sulphonic acid has been salified.

The product hardened under the above-mentioned conditions and introduced into a furnace at 1000° C. retains the structure given by the moulding and possesses good resistance to thermal shocks without cracking.

Since the setting becomes analogous to a setting by a hydraulic binder and the water becomes a water of constitution, there is no shrinkage. This is favourable for the precision manufacture of moulded metal parts.

EXAMPLE 11

Example 7 is repeated, but replacing the siliceous sand by a chromite sand having a fineness of 40/80 AFS. The temperature rises from 5° to 25° C. in 20 minutes for an ambient temperature of 18° C.

After 20 minutes of contact the product shows a rigidity sufficient for it to be removed from the mould without deformation.

What I claim is:

1. In a process for preparing conglomerate sand by mixing a sand with a setting-binder agent, the improvement comprising as said setting-binder agent the reaction product of magnesium silicate and an arylsulphonic acid in aqueous medium, said magnesium silicate being present in an amount of at least 5% by weight based on said sand and said arylsulphonic acid being present in an amount of at least 25% by weight based on said magnesium silicate.

2. The process of claim 1, wherein the arylsulphonic acid represents at least 50% of the weight of the magnesium silicate.

3. The process of claim 1 wherein water represents at least 25% of the weight of the arylsulphonic acid.

4. The process of claim 3, wherein water represents from 40 to 100% of the weight of the arylsulphonic acid.

5. The process of claim 3, wherein the arylsulphonic acid is added as an aqueous solution.

6. The process of claim 1 which consists in adding to the arylsulphonic acid a strong acid.

7. The process of claim 6, wherein the strong acid represents less than 15% of the weight of the arylsulphonic acid.

8. The process of claim 1, wherein the arylsulphonic acid is paratoluenesulphonic acid.

9. The process of claim 1, wherein the magnesium silicate is of the olivine group.

10. The process of claim 1, wherein said conglomerate sand is resin-free.

11. A self-hardening foundry composition comprising sand and, as a setting-binder agent, at least 5% by weight of a magnesium arylsulphonate.

* * * * *